US012711173B2

(12) United States Patent
Yingling et al.

(10) Patent No.: US 12,711,173 B2
(45) Date of Patent: Aug. 18, 2026

(54) GAMEPLAY ROULETTE

(71) Applicant: SONY INTERACTIVE ENTERTAINMENT LLC, San Mateo, CA (US)

(72) Inventors: Courtney Yingling, San Mateo, CA (US); Rui Yang, San Mateo, CA (US)

(73) Assignee: SONY INTERACTIVE ENTERTAINMENT LLC

( * ) Notice: Subject to any disclaimer, the term of this patent is extended or adjusted under 35 U.S.C. 154(b) by 226 days.

(21) Appl. No.: 17/510,838

(22) Filed: Oct. 26, 2021

(65) Prior Publication Data

US 2023/0127685 A1 Apr. 27, 2023

(51) Int. Cl.

*G06F 16/435* (2019.01)
*A63F 5/00* (2006.01)
*G06F 16/2457* (2019.01)
*G06N 20/00* (2019.01)

(52) U.S. Cl.

CPC .......... *G06F 16/435* (2019.01); *A63F 5/0005* (2013.01); *G06F 16/24578* (2019.01); *G06N 20/00* (2019.01)

(58) Field of Classification Search

CPC . G06F 16/435; G06F 16/24578; G06N 20/00; A63F 5/0005

USPC .......................................................... 707/734

See application file for complete search history.

(56) References Cited

U.S. PATENT DOCUMENTS

2016/0005270 A1* 1/2016 Marr .................. G07F 17/3255 463/25
2019/0308099 A1* 10/2019 Lalonde ................ A63F 13/352
2019/0373331 A1* 12/2019 Benzatti ............. H04N 21/4662
2021/0029419 A1* 1/2021 Puniyani .............. H04N 21/435
2021/0260475 A1* 8/2021 Dzjind .................. A63F 13/352
2022/0249957 A1* 8/2022 Kaufman ................ A63F 13/75

* cited by examiner

*Primary Examiner* — Tuankhanh D Phan

(74) *Attorney, Agent, or Firm* — Kilpatrick Townsend & Stockton LLP

(57) ABSTRACT

A method and system for selecting new interactive content titles for users is disclosed. A plurality of user profiles is stored in memory. Each user profile including one or more preferences and historic gameplay data associated with a user associated with the user profile. A request to select a new interactive content title for the user over a communication network from a client device associated with the user profile is received. At least one of a plurality of available interactive content titles that are not associated with the historic gameplay data is selected. The at least one interactive content titles is selected from a subset of the available interactive content titles that correspond to one or more of the preferences in the stored user profile of the user.

20 Claims, 6 Drawing Sheets

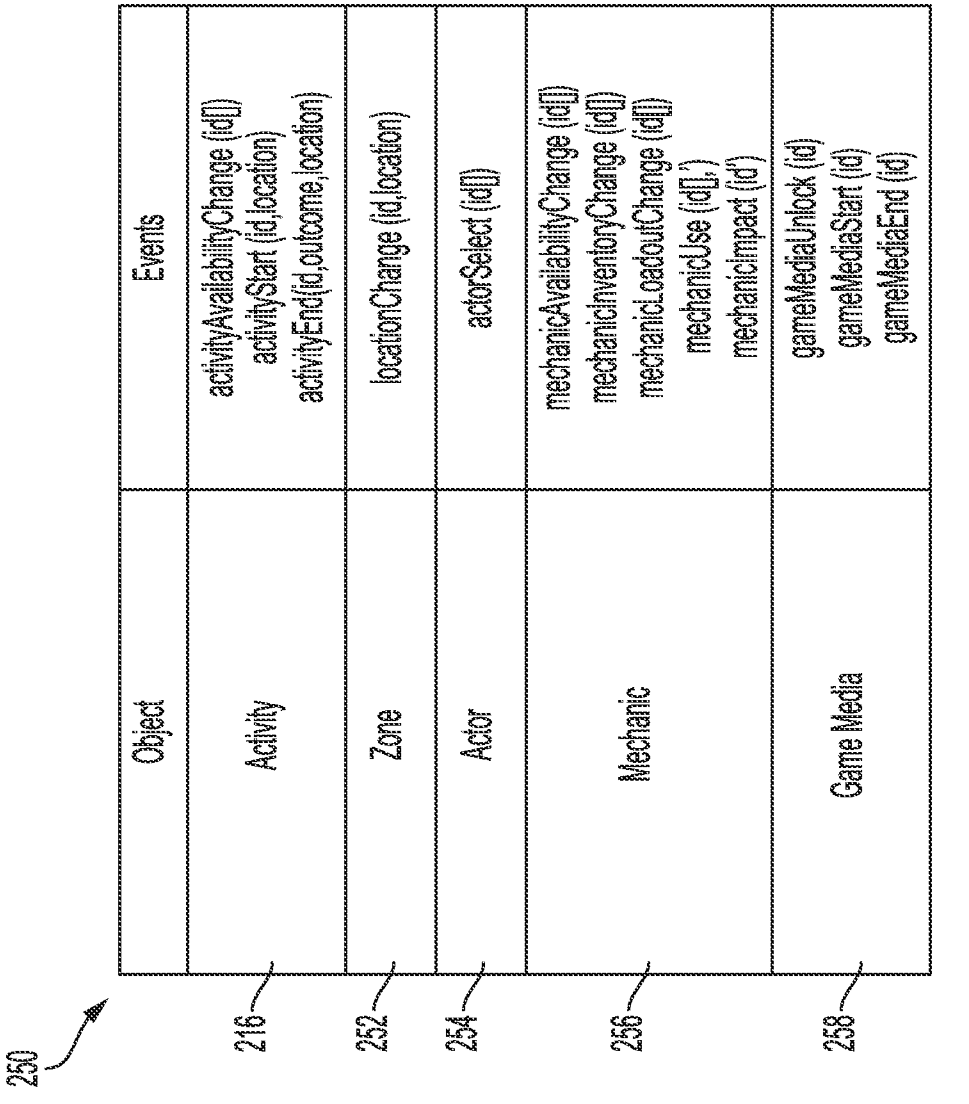

| Object | Events |
|---|---|
| Activity | activityAvailabilityChange (id[])<br>activityStart (id,location)<br>activityEnd(id,outcome,location) |
| Zone | locationChange (id,location) |
| Actor | actorSelect (id[]) |
| Mechanic | mechanicAvailabilityChange (id[])<br>mechanicInventoryChange (id[])<br>mechanicLoadoutChange (id[])<br>mechanicUse (id[],')<br>mechanicImpact (id') |
| Game Media | gameMediaUnlock (id)<br>gameMediaStart (id)<br>gameMediaEnd (id) |

FIG. 2B

GAMEPLAY ROULETTE

BACKGROUND OF THE INVENTION

1. Field of Invention

The present invention generally relates to selecting new interactive content titles for users. More specifically, the present invention relates to custom selection based on some common attributes across sessions along with an element of randomness.

2. Description of the Related Art

There is a seemingly endless selection of presently available interactive media titles, including game media titles. Even long-standing, experienced players may find it difficult to browse efficiently through all the media or game titles available. The inefficiency is further heightened due to various factors being difficult to discern without actually launching and playing the game title. That is because the experience of participating in interactive activities may be difficult to fully capture and glean from marketing materials or review publications. As a result, the process of searching for and finding new or unfamiliar content titles of interest to a particular user can be extremely time-consuming and inefficient.

Further, players of interactive content titles may not fully appreciate themselves all the factors within a particular title or session that operate in combination to result in an enjoyable gameplay experience. For example, there may be certain aspects that contributes to enjoyment, but the player may be unable to identify nor quantify such aspects nor their respective contribution towards the enjoyable experience. Most players may be more concerned with and focused on the actual gameplay itself and succeeding within the specific gameplay session, rather than analyzing their own feelings and reactions to the same. Such users would not know what to search for in order to find similar games or media that the user would enjoy. In addition, game developers and their respective systems may also find it difficult to analyze certain factors within gameplay data. Such patterns in relation to user enjoyment may only be detectable in the aggregate, which allows for control and consideration of multiple different possible factors that contribute to a particular user's enjoyment. Whereas the user may lack motivation, time, and resources to perform such analyses of themselves, other parties may lack access to the aggregate data across different platforms, systems, and titles.

Therefore, there is a need for improved systems and methods of customizing selections of new interactive content titles for users based on common attributes across sessions, along with an element of randomness.

SUMMARY OF THE CLAIMED INVENTION

A method for selecting new interactive content titles for users is disclosed. The method may include storing a plurality of user profiles in memory. Each user profile may include one or more preferences and historic user data associated with a user associated with the user profile. The method may also include receiving a request to select a new interactive content title for the user over a communication network from a client device associated with the user profile. The method may further include selecting at least one of a plurality of available interactive content titles that are not associated with the historic user data. The at least one interactive content titles may be selected from a subset of the available interactive content titles that correspond to one or more of the preferences in the stored user profile of the user.

A system for selecting new interactive content titles for users is disclosed. The system includes a memory and a processor that executes instructions stored in memory, wherein execution of the instructions by the processor may store a plurality of user profiles in memory. Each user profile may include one or more preferences and historic user data associated with a user associated with the user profile. The execution of the instructions by the processor also may cause to receive a request to select a new interactive content title for the user over a communication network from a client device associated with the user profile. The execution of the instructions by the processor also may cause to selecting at least one of a plurality of available interactive content titles that are not associated with the historic user data. The at least one interactive content titles may be selected from a subset of the available interactive content titles that correspond to one or more of the preferences in the stored user profile of the user.

A non-transitory computer-readable storage medium, having embodied thereon a program executable by a processor to perform a method for selecting new interactive content titles for users is disclosed. The method may include storing a plurality of user profiles in memory. Each user profile may include one or more preferences and historic user data associated with a user associated with the user profile. The method may also include receiving a request to select a new interactive content title for the user over a communication network from a client device associated with the user profile. The method may further include selecting at least one of a plurality of available interactive content titles that are not associated with the historic user data. The at least one interactive content titles may be selected from a subset of the available interactive content titles that correspond to one or more of the preferences in the stored user profile of the user.

BRIEF DESCRIPTION OF THE DRAWINGS

FIG. 2B illustrates an exemplary table of various objects and associated events.

DETAILED DESCRIPTION

Embodiments of the present invention include systems and methods for selecting new interactive content titles for users is disclosed. The method may include storing a plurality of user profiles in memory, each user profile including one or more preferences and historic user data associated with a user associated with the user profile. The method may also include receiving a request to select a new interactive content title for the user over a communication network from a client device associated with the user profile. The method may further include selecting at least one of a plurality of available interactive content titles that are not associated with the historic user data, wherein the at least one interactive content titles is selected from a subset of the available interactive content titles that correspond to one or more of the preferences in the stored user profile of the user.

Figure 1:
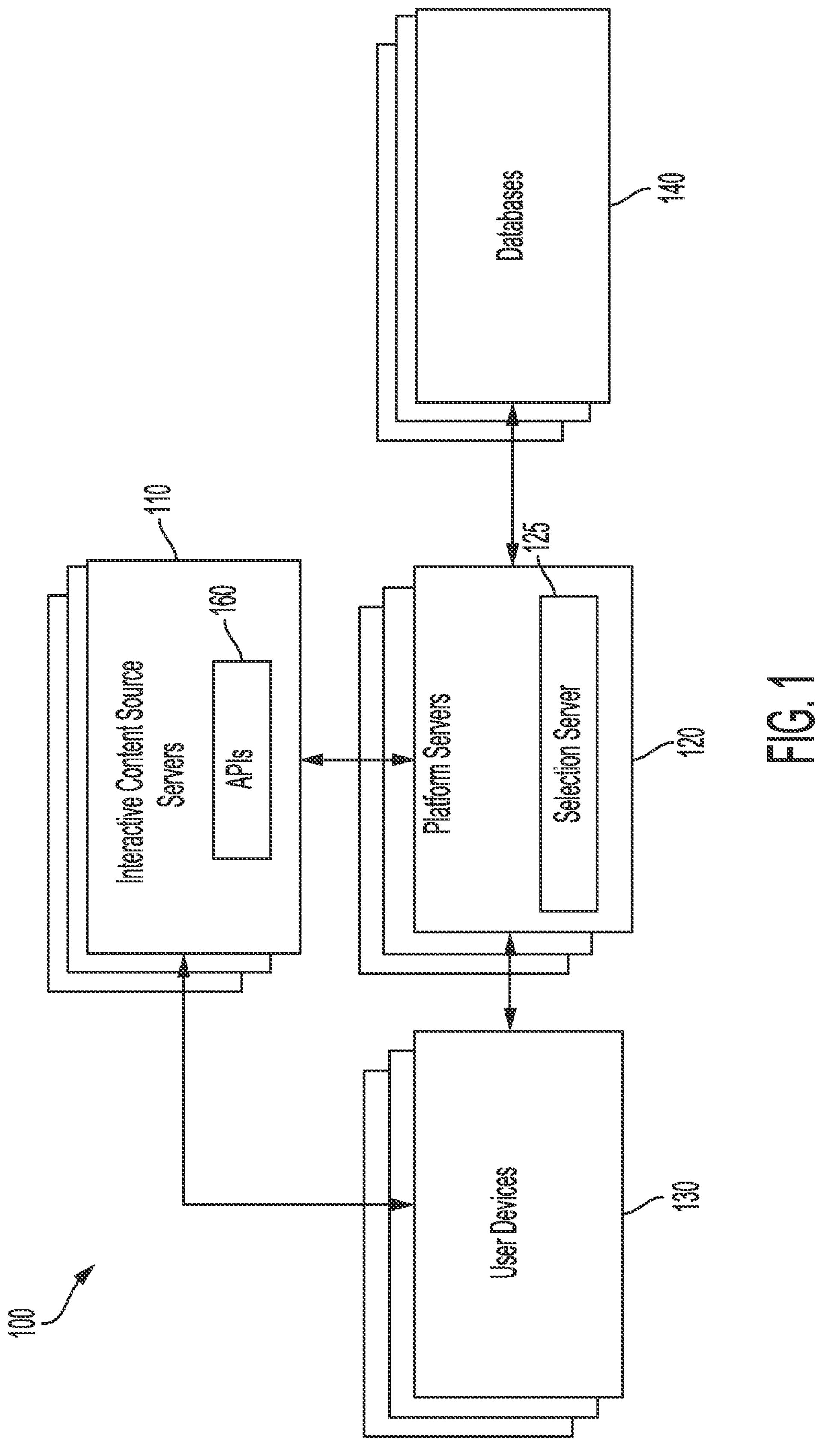
FIG. 1 illustrates an exemplary network environment in which a system for selecting new interactive content titles for users may be implemented.

FIG. 1 illustrates an exemplary network environment in which a system for selecting new interactive content titles for users may be implemented. The network environment 100 may include one or more interactive content source servers 110 that provide streaming content (e.g., interactive video, interactive virtual reality videos, etc.), one or more platform servers 120, one or more user devices 130, and one or more databases 140.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Interactive content source servers 110 may maintain, stream, and host interactive media content and digital services available to a user device 130 (that includes or is associated with a virtual reality device) over a communication network. The interactive content source servers 110 may be associated with any content provider that makes its content available for access over a communication network. Such interactive content source servers 110 may be implemented in the cloud (e.g., one or more cloud servers). Each media may include one or more sets of object data that may be available for participation with (e.g., viewing or interacting with an activity) by a user. Data about the object shown in the media may be stored by the interactive content source servers 110, platform servers 120 and/or the user device 130, in an object file 216 ("object file"), as will be discussed in detail with respect to FIG. 2A.

Such content may include not only digital video and games, but also other types of digital applications and services, including social media services used by a user to designate friends and other contacts. Such applications and services may include any variety of different digital content and functionalities that may be provided to user devices 150, including providing and supporting chat and other communication channels. The chat and communication services may be inclusive of voice-based, text-based, and video-based messages. Thus, a user device 130 may participate in a gameplay session concurrent with one or more communication sessions, and the gameplay and communication sessions may be hosted on one or more of the interactive content source servers 110.

The platform servers 120 may be responsible for communicating with the different interactive content source servers 110, databases 140, and user devices 130. Such platform servers 120 may be implemented on one or more cloud servers. The interactive content source servers 110 may communicate with multiple platform servers 120, though the interactive content source servers 110 may be implemented on one or more platform servers 120. The platform servers 120 may also carry out instructions, for example, receiving a user request from a user to stream streaming media (i.e., games, activities, video, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, mechanic information, game media information, etc.) displayed during at least a portion of the streaming media.

The platform servers 120 may include a selection server 125 that may receive a request to select a new (to the user) interactive content title for the user over a communication network from a client device associated with the user profile. The selection server 125 may initially filter a subset of the available interactive content titles that correspond to one or more of the preferences in the stored user profile of the user. The selection server 125 may further select at least one of a plurality of available interactive content titles based on random.

For example, first-player shooter games, platform games, and action-adventure games may represent a disproportionate segment of game genres played by a specific player, indicating a preference for such game types. Selecting a new interactive content title may be based on such preferences (as determined by selection server 125 and stored in the user profile), which may include one or more settings set by default, by the user, by selection server 125, or a combination of the foregoing. The settings may thereafter indicate that the user prefers first-player shooter games, platform games, and action-adventure games based on a manual indication of preference or based on identifying common attributes of historical gameplay data. Similarly, the user of user device 130 may further be associated with viewing a disproportionate number of action-adventure movies, spy thrillers, war movies, etc. Such user may also be connected to peers who exhibit such preferences. Further, a user may have different gameplay habits with different peer groups. For example, a user may enjoy gameplay of action-adventure with one peer group, but may also enjoy gameplay of music-related game titles with another peer group.

The selection server 125 may filter game titles with which the user has no historic gameplay data (e.g., game titles that are new or unfamiliar to the user) based on the preferences in the stored user profile. As a result of the filtering, a subset of the new titles may be identified that corresponds to the specific user's determined preferences. To further filter the subset and make a selection therefrom, the selection server 125 may further select a random set of media elements associated with historic gameplay. For example, the media elements may include music/score, peer players, animation styles, in-game weapons, vehicles, or other virtual objects, etc., associated with the titles that the user has played. The randomly selected elements may be used to identify one or more titles in the subset have share or that are capable of operating using the same media elements. The selection server 125 may thus identify at least one title from the subset as the basis for launching an interactive session in conjunction with the media elements. As a result, certain options for playing the selected title may also be automatically preselected or preset, including selected peers for teammates or opponents, selected gameplay modes, audio-visual and virtual settings, etc. The player who requests the game recommendation may therefore be automatically presented with the selected interactive content title launched in accordance with the randomly selected media elements.

As another example, if the interactive content title is associated with an exercise-based session, random elements may be interleaved during the exercise session as part of interval training. Some random elements may include music selections, virtual environment(s), game non-player characters appearing, sound effects, exercise challenges, etc. The user may provide feedback by way of answering questions, requests for repeated sessions or elements, and subsequent engagement actions with the same or different title (and associated activities).

In some embodiments, historic data regarding the gameplay and viewing habits of the player (or their friends or peers) may be tracked or otherwise obtained from one or more sources (e.g., interactive content source servers 110) over a communication network. As described in further detail below in the description of FIG. 2A, for example, recording the historic data may include recording object data onto an object ring-buffer. The recorded object data may be stored in one or more object files that store data regarding one or more activities associated with past interaction by the user with one or more past interactive content titles, wherein the stored user profile includes at least one object file. In addition, historic data regarding social contacts and other consumption or engagement with other content titles may be obtained from one or more interactive content source servers 110 over a communication network. Such data may also be provided to selection server 120 for analysis and use in refining learning models associated with the user.

A machine learning model may be applied to the historic user data to identify one or more common gameplay attributes across the one or more activities in one or more content titles. The preferences may correspond to the identified gameplay attributes. For example, the historical user data may indicate that the player enjoys playing first-player shooter games with puzzle aspects, working on a VR headset to upper body intensive workouts on Tuesdays, or multiplayer games on Fridays. The plurality of available interactive content titles may be evaluated to identify the subset. Each of the available interactive content titles may exhibit one or more of the identified gameplay attributes corresponding to the preferences.

In addition, in association with each user profile, the one or more preferences and historic viewing data may be stored in association with the user profile. Historical viewing data may include watch history of media titles. In some cases, there may be correlations between media titles and interactive media titles such that users that have watched certain media titles may also enjoy certain interactive media titles. For example, users that have watched Spiderman (any one of the several movies) may enjoy video games featuring Spiderman or featuring characters, storylines, or other attributes of Spiderman the movie. As another example, users that enjoy watching superhero movies may enjoy playing action-adventure games. Therefore, a machine learning model may be applied to historic viewing data to identify one or more common attributes across one or more viewed media titles, wherein the one or more preference correspond to identified gameplay attributes that are identified based on common attributes across the one or more of viewed media titles.

User data may also be associated with peer user data based on similar taste, which may indicate that users that typically like a certain type of game or media may also like another kind of game or media. Selection of such tangential games may be improved by such data points. Lastly, receiving recommendations may also be helpful if there is an element of randomness that could bring new and fresh experience for the user. For example, once the identified gameplay attributes are determined, selecting from a subset of interactive content titles may be at random.

The streaming media and the associated at least one set of object data may be provided through an application programming interface (API) 160, which allows various types of interactive content source servers 110 to communicate with different platform servers 120 and different user devices 130. API 160 may be specific to the particular computer programming language, operating system, protocols, etc., of the interactive content source servers 110 providing the streaming media content titles, the platform servers 120 providing the media and the associated at least one set of object data, and user devices 130 receiving the same. In a network environment 100 that includes multiple different types of interactive content source servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). The user device may include one or more devices associated with a user or a user device capable of displaying on one or more screens.

The databases 140 may be stored on the platform servers 120, the interactive content source servers 110, any of the servers 218 (shown in FIG. 2A), on the same server, on different servers, on a single server, across different servers, or on any of the user devices 130. Such databases 140 may store the streaming media and/or an associated set of object data. Such streaming media may depict one or more objects (e.g., activities) that a user can participate in or interact with. One or more user profiles may also be stored in the databases 140. Each user profile may include information about the user (e.g., user progress in an activity and/or media content title, user id, user game characters, etc.) and may be associated to media.

In an exemplary embodiment of the present invention, platform servers 120 may capture data, including object data, regarding current sessions. During gameplay of a particular game title, for example, platform servers 120 may record corresponding gameplay data (including video, metadata regarding in-game status and actions, etc.) sufficient to recreate the gameplay of a current session in a future gameplay session. Data regarding the particular in-game activity may also be captured (and described in further detail in relation to FIG. 2A) and stored in database(s) 140. Object data may include audiovisual and/or sensory components that are effectuated in a virtual environment of a current session. The object data may be associated with timestamps. Therefore, the selection server 125 may identify one or more common gameplay attributes across one or more activities in the gameplay sessions, wherein the preferences correspond to the identified gameplay attributes.

In an exemplary implementation, databases 140 may store information regarding a plurality of past and current sessions, including the object data that have been identified within each corresponding media file. Platform servers 120 may further analyze gameplay data from a current session associated with a specific player to identify gameplay attributes. Such analysis may further include evaluation in comparison to historical user data and metadata of the same player or of other players of the same or similar game titles as stored in databases 140.

Figure 2A:
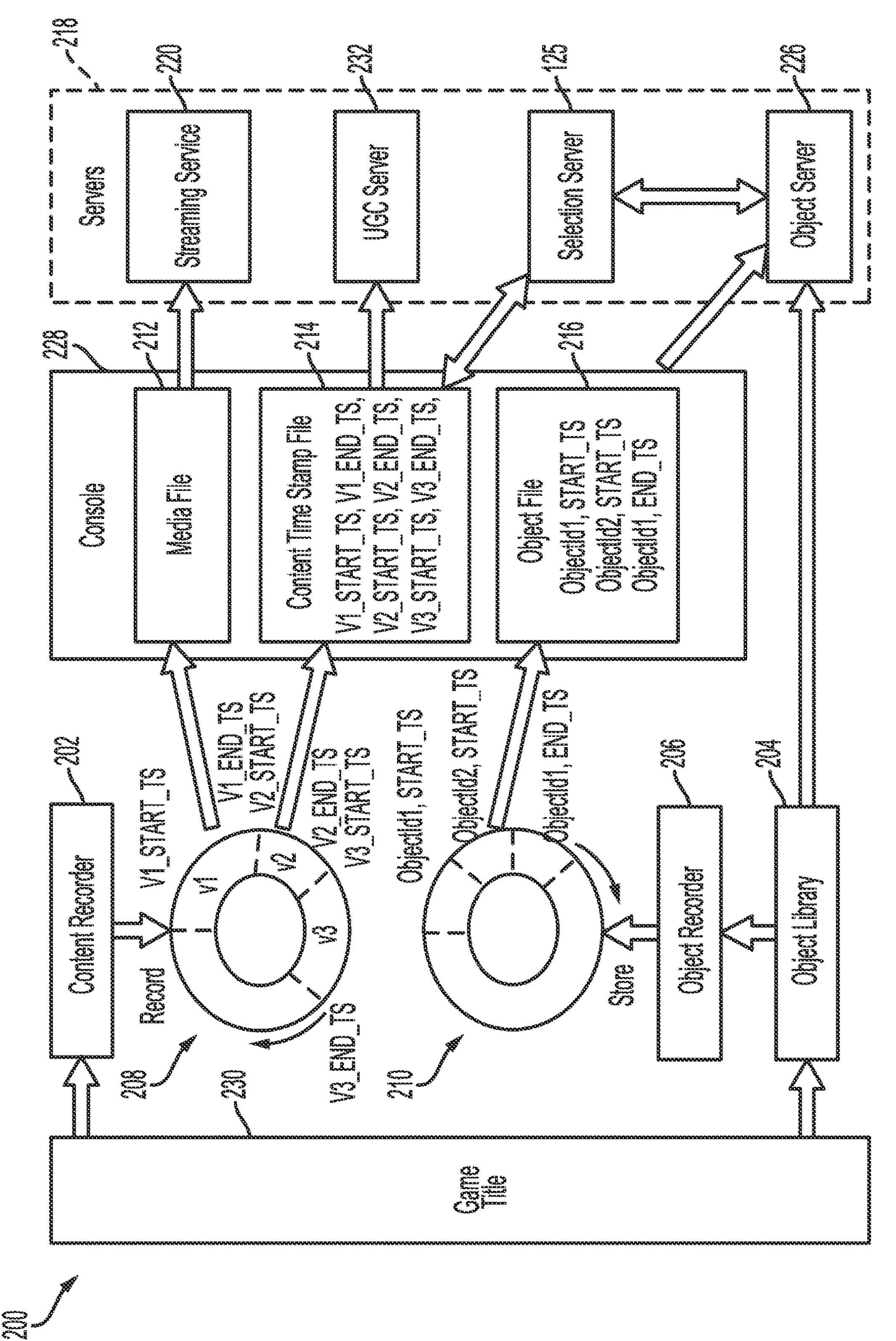
FIG. 2A illustrates an exemplary uniform data system (UDS) that may be used to provide data to a system for selecting new interactive content titles for users.

FIG. 2A illustrates an exemplary uniform data system (UDS) 200 that may be used to provide data to a system for providing visual comparisons to previous gameplay. Based on data provided by UDS, the selection server 125 can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2A, an exemplary console 228 (e.g., a user device 130) and exemplary servers 218 (e.g., streaming server 220, the selection server 125, a user-generated content (UGC) server 232, and an object server 226) are shown. In one example, the console 228 may be implemented on the platform servers 120, a cloud server, or on any of the servers 218. In an exemplary example, a content recorder 202 may be implemented on the platform servers 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be sent to the selection server 125 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object begins and ends. The object library 204 and the object recorder 206 may be implemented on the platform servers 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the object data onto an object ring-buffer 210 (e.g., ObjectID1, START_TS; ObjectID2, START_TS; ObjectID3, START_TS). Such object data recorded onto the object ring-buffer 210 may be stored in the object file 216.

Such object file 216 may also include activity start times, activity end times, an activity ID, activity results, activity types (e.g., tutorial interaction, menu access, competitive match, quest, task, etc.), user or peer data related to the activity. For example, an object file 216 may store data regarding an in-game skill used, an attempt to use a skill, or success or failure rate of using a skill during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

As shown in the exemplary table 250 of FIG. 2B, such object data (e.g., the object file 216) may be associated with event information regarding activity availability change and may be related to other objects with associated event information. For example, such object data may be zone data files 252, actor data files 254, mechanics data files 256, game media data files 258, and other gameplay-related data files.

Such object data (e.g., the object file 216) may be categorized as in in progress, open-ended, or competitive. Such object data files 216 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such object data files 216 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4×4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform servers 120 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game and can be player-controller or game-controlled and can change dynamically during gameplay. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform servers 120. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform servers 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g, fire arrow, fire damage) or whether an initiator is the player, such that whether the mechanics were used by or against the player. Such mechanics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

Object data (e.g., activity data, zone data, actor data, mechanics data, etc.) may be associated with one another to form object-object associations. The object data may also be associated with the media files (e.g., media file 212) and for media-object bindings. These object-object associations and media-object bindings, along with other associations made with respect to aspects (e.g., activities, actors, actions, etc.) displayed in the media, may indicate particular patterns such that future object data may be predicted based on such associations that form object aggregations. Object aggregations may form one or more relationships between the object data through algorithms, logic functions, statistical analysis, and other dataset analyses.

Figure 3:
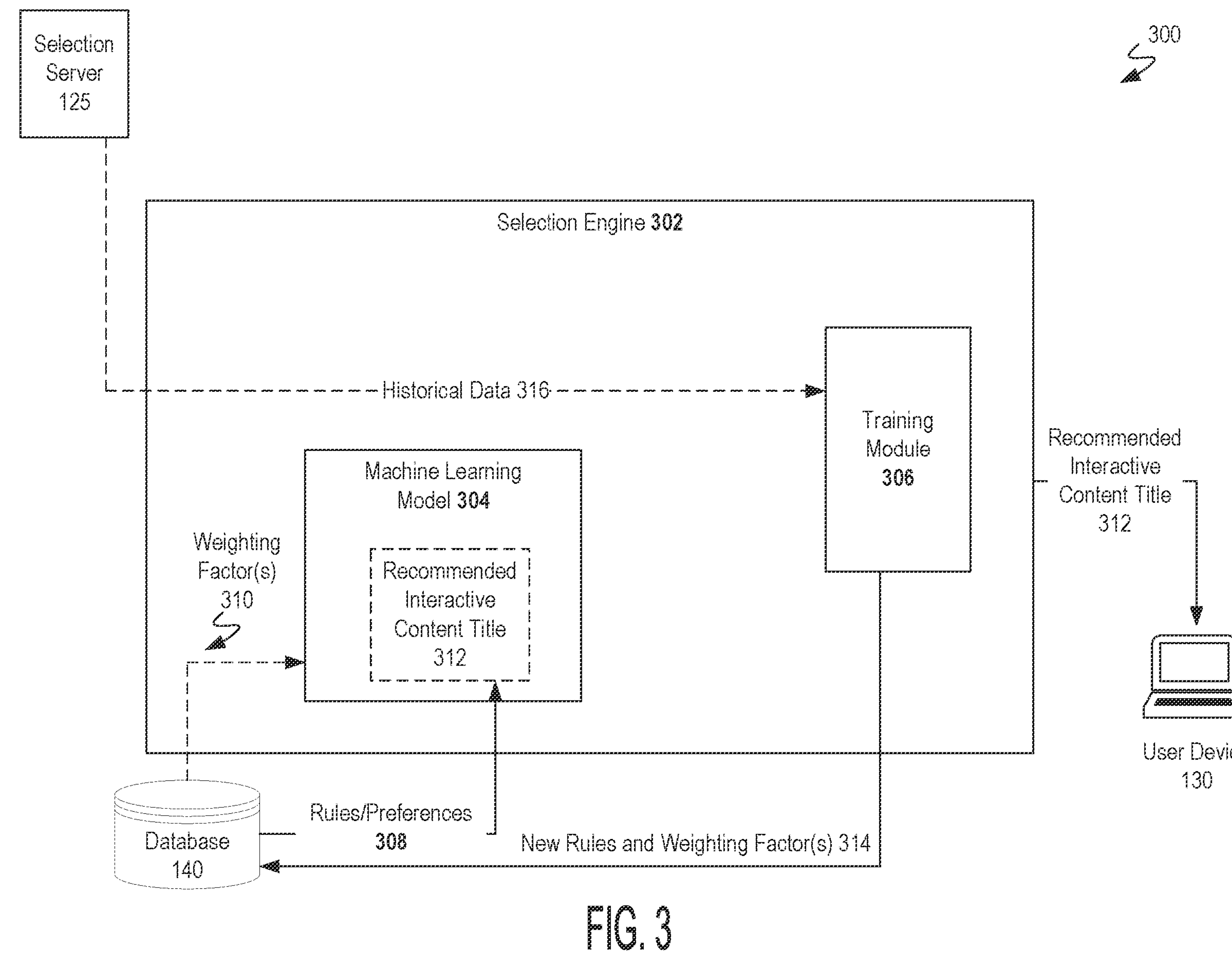
FIG. 3 is a block diagram of an exemplary selection engine for implementing selection of new interactive content titles based on historical data received from the selection server.

FIG. 3 is a block diagram of an exemplary selection engine 302 for implementing selection of new interactive content titles based on historical data received from the selection server 125. System 300 is concerned with using machine learning to learn from historical gameplay and/or viewing data and customization and refinement of custom recommendations for new gameplay sessions over time.

As illustrated, selection engine 302 may be in communication with selection server 125, a user device 130, and database 140. Selection engine 302 may include a machine learning model 304 for selecting a recommended interactive content title 312 and associated activity for a new gameplay session and a training module 306 for training the machine learning model 304. In particular, the selection engine 302 may receive rules and preferences 308 from databases 140 and weighting factors 310 that may be used to generate a recommended interactive content title 312 to the user device 130, which may even more specific to a particular acitivty of the interactive content title and the peers with whom the user can play with for multiplayer games. Such data may further be used to learn and refine prioritization decisions (including any additional or adjusted new rules and weighting factors 314) over time. For example, the selection server 125 may send historical data 316 to a training module 306 that may formulate new rules and weighting factors 314.

Machine learning model 304 of the selection engine 302 may receive weighting factors 310 from the databases 140 and rules and preferences 308 from databases 140. The machine learning model 304 may include one or more algorithms executable independently or in combination to evaluate prioritization decisions currently and previously made by the selection engine 302. Such evaluation by the machine learning model 304 may be based on a weighted linear regression model, a weight-based decision tree model, a neural network model, other models known in the art, and combinations of the foregoing.

The machine learning model 304 may include one or more algorithms, to be used independently or in combination. Parameters of the machine learning model 304 may specify which algorithms are used, the algorithm parameters used in each algorithm, and how the results of each algorithm are congregated or combined to arrive at an output or a prioritized game view result. The machine learning model 304 may be based on one or a combination of the following: a weighted linear regression model, a weight-based decision tree model, and a neural network model.

As such, the machine learning model 304 may evaluate the recommended interactive content title 312 in conjunction with datasets associated with the weighting factors 310 and rules and preferences 308. The recommended interactive content title 312 may also include a list of alternates that also satisfy the weighting factors and rules 310 and preferences 308. When evaluated in conjunction with the other data, however, the machine learning model 304 may identify insights regarding the recommendation decisions for the recommended interactive content title 312—e.g., patterns, trends, and deviations therefrom—that indicate a need to adjust current rules, preferences, or parameters thereof.

According to some examples, the training module 306 may further adjust the weighting factors 310 and rules and preferences 308 as more historical data 316 is received from the selection server. The historical data 316 may be historical gameplay or viewing data. The training module 306 may update the machine learning model 304 in view of the same. The recommended interactive content title 312 may be thereafter be propagated for display at the user device 130 as shown in FIG. 3.

Figure 4:
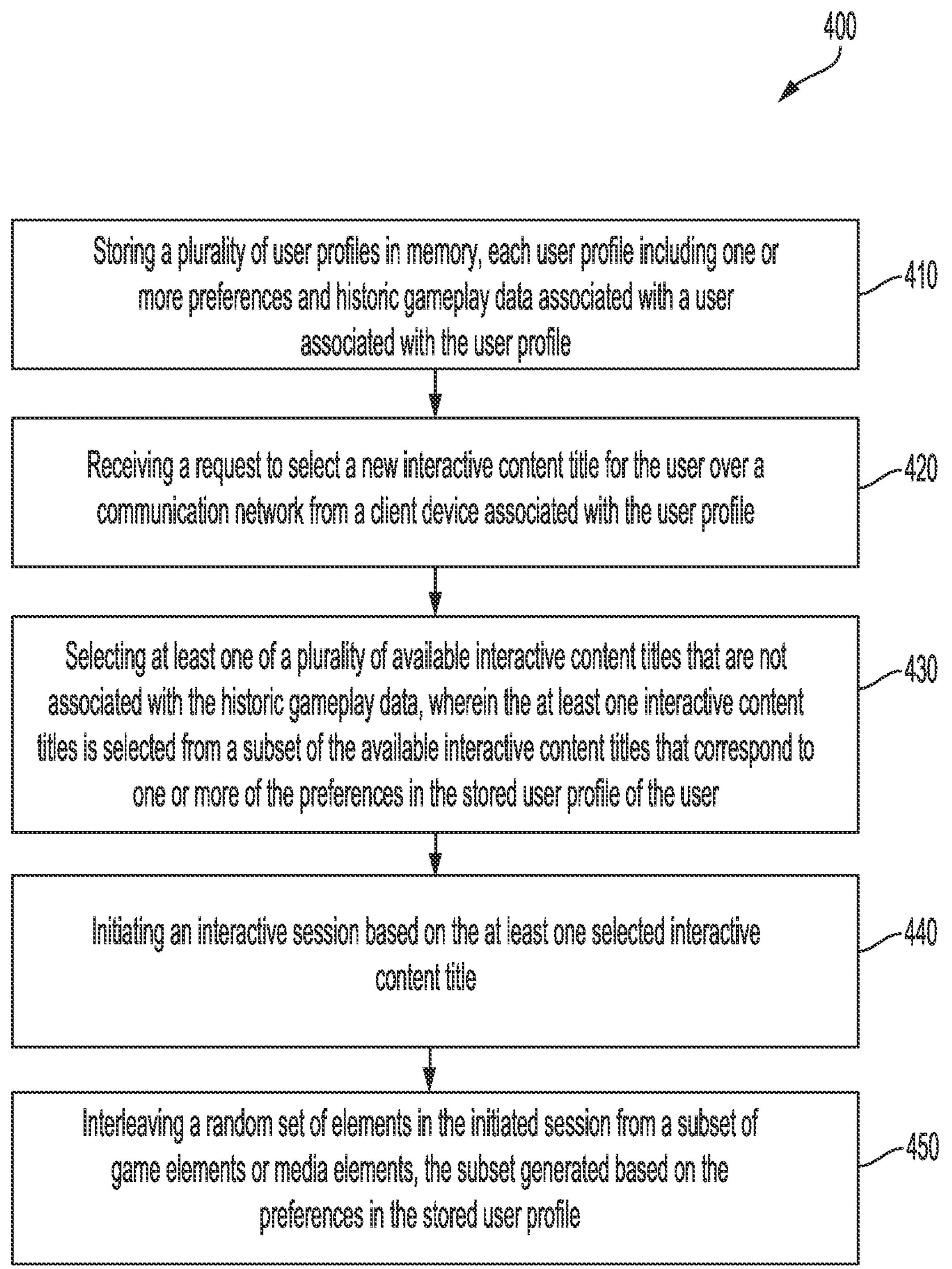
FIG. 4 is a flowchart illustrating an exemplary method for selecting new interactive content titles for users.

FIG. 4 is a flowchart illustrating an exemplary method 400 for selecting new interactive content titles for user, according to some aspects of the present disclosure. The steps identified in FIG. 4 are exemplary and may include various alternatives, equivalents, or derivations thereof including but not limited to the order of execution of the same. The steps of the process of FIG. 4 and any alternative similar processes may be embodied in hardware or software including a computer-readable storage medium including instructions executable by the likes of a processor in a computing device.

In step 410, a plurality of user profiles may be stored in memory. Each user profile may include one or more preferences and historic gameplay data associated with a user associated with the user profile may be stored. The one or more preferences may be set by the user, determined based on the historic gameplay data, or as a default setting. Such preferences may indicate preferences for gameplay that may be further determined based on known attributes of the user, such as age, gender, average duration of play, favorite days and times of play, etc. Such preferences may be useful in determining kinds of interactive content title to recommend to the user.

In step 420, a request to select a new interactive content title for the user may be received over a communication network from a client device associated with the user profile. The request may be for a recommendation that is based on common attributes to past gameplay session or may be set for a more randomized selection. A more randomized selection may allow the selection server 125 to select a random interactive content title from a subset of interactive content titles. The subset may be generated based on stored plurality of datasets. The stored datasets may be associated with preferences of user accounts, and the preferences based on past selections of interactive content titles by the user accounts.

In step 430, at least one of a plurality of available interactive content titles that are not associated with the historic gameplay data may be selected. The at least one interactive content titles may be selected from a subset of the available interactive content titles that correspond to one or more of the preferences in the stored user profile of the user. As mentioned above, the one or more preferences may be based on gameplay preferences of the user, which may be determined based on metadata associated with historical gameplay and viewing data. The metadata may be recorded along with gameplay session. The recorded metadata may be applied to a learning algorithm or machine learning server to determine common gameplay attributes or patterns by the user.

For example, the recorded metadata may indicate that the user has a preference for action role-playing titles that have an average length of less than 10 hours, or a preference for competitive sports games for advanced players. With these kinds of preferences stored with the stored user profile, the user will be recommended what appears to be random games that the user may or may not be familiar with, but with a smart algorithmic decision making server, such as the selection server 125, in the back-end to help facilitate the recommendation process.

In step 440, an interactive session based on the at least one selected interactive content title may be initiated. The interactive session may also be a multiplayer session that includes other players, whom also were recommended this same multiplayer session based on their own preferences. For example, each of the players may enjoy similar types of games at similar times in the day or week or may further also enjoy playing with peers similar to these players, with similar level of skill.

In step 450, a random set of elements may be interleaved in the initiated session. The random set of elements may be from a subset of game elements or media elements, and the subset generated may be based on the preferences in the stored user profile. The random set of game or media elements may include sounds, music, non-player characters, virtual environments, voices or accents, colors or styles, etc. These kinds of game or media elements randomized may add a level of extemporaneity that may keep the gameplay experience fresh and interesting to the players. Thus, the random sets of elements may add an element of surprise and help with keeping the player on their toes.

In association with each user profile, the one or more preferences and historic viewing data associated with the user associated with the user profile may be stored. The selection server 125 may applying a machine learning model to the historic viewing data to identify one or more common attributes across one or more viewed media titles. The one or more preferences may correspond to identified gameplay attributes that are identified based on common attributes across the one or more of viewed media titles. A random set of elements may be interleaved in the initiated session from a subset of game elements or media elements, the subset generated based on the preferences in the stored user profile.

Recording the historic gameplay data may include recording object data onto an object ring-buffer and storing the recorded object data in one or more object files that store data regarding one or more activities associated with past interaction by the user with one or more past interactive content titles. In some examples, the stored user profile may include at least one object file.

A machine-learning model may be applied to the historic gameplay data to identify one or more common gameplay attributes across the one or more activities. The preferences may correspond to the identified gameplay attributes. The plurality of available interactive content titles may be evaluated to identify the subset. In some examples, each of the available interactive content titles may exhibit one or more of the identified gameplay attributes corresponding to the preferences. Furthermore, the at least one interactive content titles may be based on determining that the one or more gameplay attributes exhibited by the selected interactive content titles meets a predetermined threshold. The predetermined threshold may be a percentage of all the identified gameplay attributes or may be a mere minimum number of gameplay attributes that are shared with the identified gameplay attributes.

The machine learning model associated with the user may be updated based on the preferences corresponding to the identified gameplay attributes, the machine learning model specifying one or more gameplay attributes and an associated prioritization. In addition, the machine learning model may be updated over time based on feedback from the user. The feedback may indicate an updated prioritization for one or more of the gameplay attributes. Updating the machine learning model may include adjusting one or more weighting factors associated with the updated prioritization.

Figure 5:
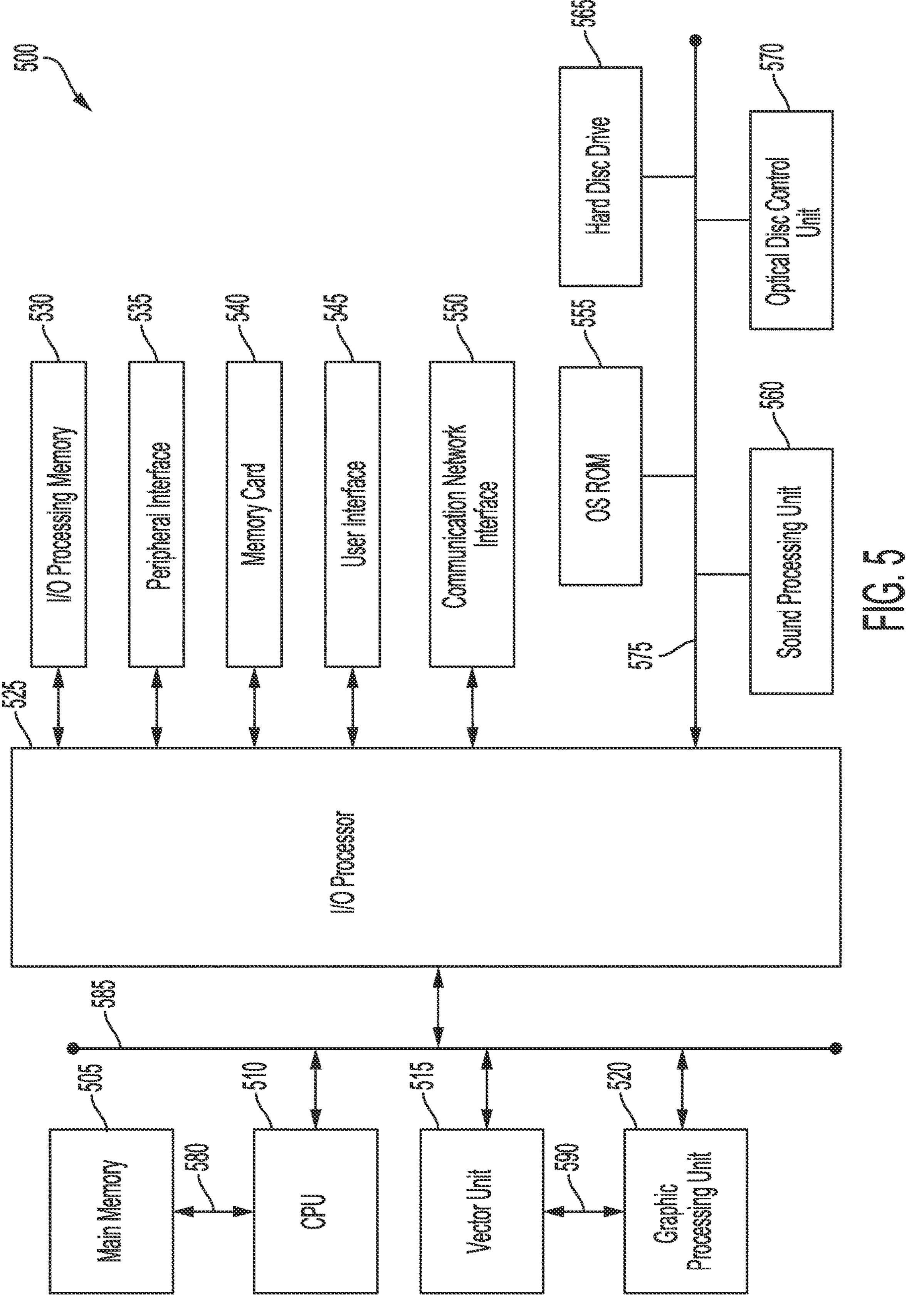
FIG. 5 is a block diagram of an exemplary electronic entertainment system, according to some aspects of the present disclosure.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 555. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 594 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for selecting new interactive content titles for new gameplay sessions, the method comprising:

storing historic gameplay data of a user device from a plurality of past interactive sessions of a plurality of past interactive content titles in memory, wherein the historic gameplay data includes:

a plurality of past gameplay attributes of a past interactive content title of the plurality of past interactive content titles; and a set of past audiovisual in-game media elements that are presented in a past virtual environment during gameplay of one or more interactive content titles of the plurality of past interactive content titles;

applying a machine learning model to the historic gameplay data to identify one or more common gameplay attributes of the plurality of past gameplay attributes that are shared across a subset of the plurality of past interactive content titles played by the user device;

selecting a new interactive content title that is not one of a past interactive content title of the plurality of past interactive content titles and that includes the one or more common gameplay attributes, wherein the new interactive content title includes a pre-existing set of audiovisual in-game media elements;

selecting a custom audiovisual in-game media element from among the set of past audiovisual in-game media elements, wherein the custom audiovisual in-game media element is different than each audiovisual in-game media element of the pre-existing set of audiovisual in-game media elements; and initiating a new interactive session to present a new virtual environment of the new interactive content title on the user device, wherein the new virtual environment includes a combination of in-game media elements of the custom audiovisual in-game media element of the set of past audiovisual in-game media elements interleaved with the pre-existing set of audiovisual in-game media elements associated with the new interactive content title.

2. The method of claim 1, further comprising generating the subset by filtering the plurality of past interactive content titles based at least in part on the common gameplay attributes of the plurality of past gameplay attributes.

3. The method of claim 1, wherein selecting a new interactive content title is based at least in part on determining that one or more gameplay attributes exhibited by a selected activity within the new interactive content title meets a predetermined threshold.

4. The method of claim 1, wherein the audiovisual in-game media elements integrated into the new interactive session include one or more randomly selected game elements or media elements associated with the historic gameplay data.

5. The method of claim 1, further comprising recording the historic gameplay data by:

recording object data onto an object ring-buffer; and storing the recorded object data in one or more object files that store data regarding one or more activities associated with past interaction by the user with one or more past interactive content titles, wherein a stored user profile associated with the user device includes at least one object file.

6. The method of claim 1, further comprising evaluating the plurality of past interactive content titles to identify the subset, wherein each of the past interactive content titles exhibit one or more of the common gameplay attributes.

7. The method of claim 6, further comprising updating the machine learning model associated with the user based on the common gameplay attributes, the machine learning model specifying one or more past gameplay attributes and an associated prioritization.

8. The method of claim 6, further comprising updating the machine learning model over time based on feedback from the user, the feedback indicating an updated prioritization for one or more of the past gameplay attributes.

9. The method of claim 8, wherein updating the machine learning model includes adjusting one or more weighting factors associated with the updated prioritization.

10. A system comprising:

memory that stores historic gameplay data of a user device during a plurality of interactive sessions in memory, wherein the historic gameplay data includes:

a plurality of past gameplay attributes of a past interactive content title of a plurality of past interactive content titles; and a set of past audiovisual in-game media elements that are presented in a past virtual environment during gameplay of one or more interactive content titles of the plurality of past interactive content titles; and a processor that executes instructions stored in memory, wherein the processor executes the instructions to:

apply a machine learning model to the historic gameplay data to identify one or more common gameplay attributes of the plurality of past gameplay attributes that are shared across a subset of the plurality of past interactive content titles played by the user device;

select a new interactive content title that is not one of a past interactive content title of the plurality of past interactive content titles and that includes the one or more common gameplay attributes, wherein the new interactive content title includes a pre-existing set of audiovisual in-game media elements;

select a custom audiovisual in-game media element from among the set of past audiovisual in-game media elements, wherein the custom audiovisual in-game media element is different than each audiovisual in-game media element of the pre-existing set of audiovisual in-game media elements; and initiating a new interactive session to present a new virtual environment of the new interactive content title on the user device, wherein the new virtual environment presents includes a combination of in-game media elements of the custom audiovisual in-game media element of the set of past audiovisual in-game media elements interleaved with the pre-existing set of audiovisual in-game media elements associated with the new interactive content title.

11. The method of claim 1, wherein the audiovisual in-game media elements include at least one of virtual interactive gameplay elements, music, gameplay sounds, or colors.

12. The method of claim 11, wherein:

the virtual interactive gameplay elements include peer players, animation styles, or virtual objects; and the virtual objects include in-game weapons, vehicles, or non-player characters.

13. The method of claim 1, wherein the gameplay attributes includes at least one of a game genre, a date and time of the plurality of past interactive content titles, historical viewing data of non-interactive media titles, or peer gameplay attributes of other user devices.

14. The method of claim 1, wherein selecting the custom audiovisual in-game media element includes randomly selecting an audiovisual in-game media element from among the set of past audiovisual in-game media elements.

15. The system of claim 10, wherein the processor executes further instructions to generate the subset by filtering the plurality of past interactive content titles based at least in part on the common gameplay attributes of the plurality of past gameplay attributes.

16. The system of claim 10, wherein the processor selecting a new interactive content title is based at least in part on determining that one or more gameplay attributes exhibited by a selected activity within the new interactive content title meets a predetermined threshold.

17. The system, of claim 10, wherein the audiovisual in-game media elements integrated into the new interactive session include one or more randomly selected game elements or media elements associated with the historic gameplay data.

18. The system of claim 10, wherein the processor records the historic gameplay data by:

recording object data onto an object ring-buffer; and storing to memory the recorded object data in one or more object files that store data regarding one or more activities associated with past interaction by the user with one or more past, interactive content titles, wherein a stored user profile associated with the user device includes at least one object file.

19. The system of claim 10, wherein the processor executes further instructions to evaluate the plurality of past interactive content titles to identify the subset, wherein each of the past interactive content titles exhibit one or more of the common gameplay attributes.

20. One or more non-transitory computer-readable media comprising computer-executable instructions that, when executed by one or more processors, cause the one or more processors to perform operations comprising:

storing historic gameplay data of a user device from a plurality of past interactive sessions of a plurality of past interactive content titles in memory, wherein the historic gameplay data includes:

a plurality of past gameplay attributes of a past interactive content title of the plurality of past interactive content titles; and a set of past audiovisual in-game media elements that are presented in a past virtual environment during gameplay of one or more interactive content titles of the plurality of past interactive content titles;

applying a machine learning model to the historic gameplay data to identify one or more common gameplay attributes of the plurality of past gameplay attributes that are shared across a subset of the plurality of past interactive content titles played by the user device;

selecting a new interactive content title that is not one of a past interactive content title of the plurality of past interactive content titles and that includes the one or more common gameplay attributes, wherein the new interactive content title includes a pre-existing set of audiovisual in-game media elements;

selecting a custom audiovisual in-game media element from among the set of past audiovisual in-game media elements, wherein the custom audiovisual in-game media element is different than each audiovisual in-game media element of the pre-existing set of audiovisual in-game media elements; and initiating a new interactive session to present a new virtual environment of the new interactive content title on the user device, wherein the new virtual environment presents includes a combination of in-game media elements of the custom audiovisual in-game media element of the set of past audiovisual in-game media elements interleaved with the pre-existing set of audiovisual in-game media elements associated with the new interactive content title.

* * * * *